United States Patent [19]

Kunimine et al.

[11] Patent Number: 5,202,843
[45] Date of Patent: Apr. 13, 1993

[54] CAE SYSTEM FOR AUTOMATIC HEAT ANALYSIS OF ELECTRONIC EQUIPMENT

[75] Inventors: Naoki Kunimine; Noboru Kimura, both of Tokyo, Japan

[73] Assignee: Oki Electric Industry Co., Ltd., Tokyo

[21] Appl. No.: 690,586

[22] Filed: Apr. 24, 1991

[30] Foreign Application Priority Data

Apr. 25, 1990 [JP] Japan .................................. 2-111509
May 25, 1990 [JP] Japan .................................. 2-136242

[51] Int. Cl.⁵ ............................................. G06F 15/60
[52] U.S. Cl. ............................... 364/578; 364/509; 364/557
[58] Field of Search ................... 364/551.01, 578, 505, 364/509, 512, 557, 558; 395/119, 120, 125, 123, 141, 161

[56] References Cited

U.S. PATENT DOCUMENTS

| | | | |
|---|---|---|---|
| 4,573,132 | 2/1986 | Boothman et al. | 364/557 |
| 4,737,917 | 4/1988 | Perron | 364/557 |
| 4,819,161 | 4/1989 | Konno et al. | 364/578 |
| 4,933,889 | 6/1990 | Meshket et al. | 364/505 |
| 5,010,501 | 4/1991 | Arakawa | 395/123 |

Primary Examiner—Parshotam S. Lall
Assistant Examiner—Michael Zanelli
Attorney, Agent, or Firm—Edward D. Manzo; John J. King

[57] ABSTRACT

A computer aided engineering (CAE) system for effecting heat analysis of electronic equipment or similar equipment by using a finite difference method, node method, etc. As the operator enters data representative of the tridimensional configuration of equipment, a dividing section divides the data into a plurality of blocks and generate node data representative of the individual blocks. A ventilation circuit generator and a heat circuit generator generate, respectively, a ventilation circuit network and a heat circuit network, or analysis models, by using the node data and data fetched from a data base. A processing section processes the ventilation and heat circuit networks to calculate temperatures and pressures. A tridimensional wire frame generator generates tridimensional wire frame data by processing parameter data indicative of the dimensions and kinds of structural parts and elements of the euqipment.

19 Claims, 14 Drawing Sheets

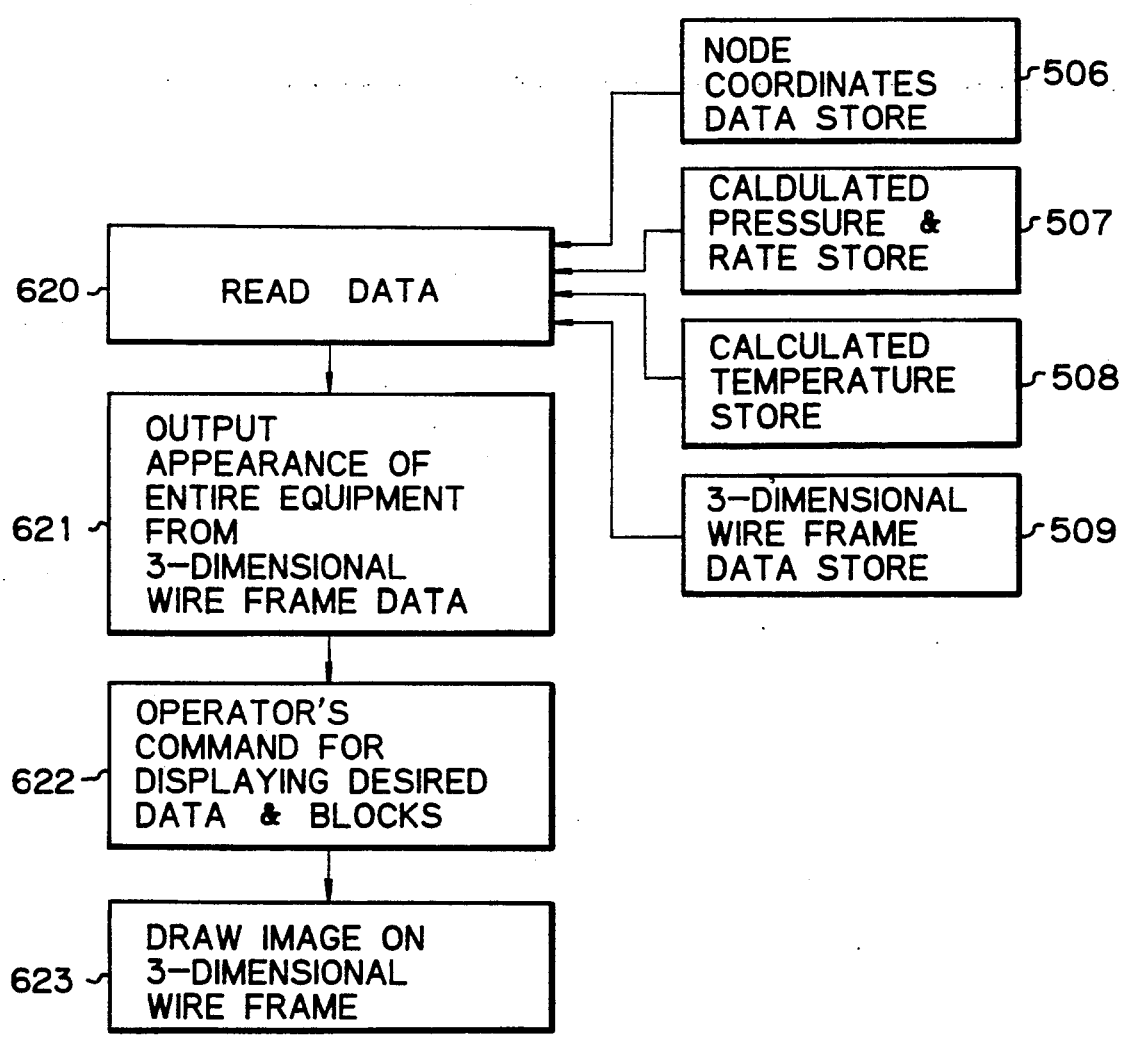

CAE SYSTEM FOR AUTOMATIC HEAT ANALYSIS OF ELECTRONIC EQUIPMENT

BACKGROUND OF THE INVENTION

1. Field of the Invention

The present invention relates to a computer aided engineering (CAE) system and, more particularly, to a CAE system for effecting the heat analysis of electronic equipment by a finite difference method, node method or similar method.

2. Description of the Prior Art

Design analysis calculations using a computer is extensively used today and has come to implement the versatile inspection of the behavior of an object to be designed. Especially, the application of a CAE system to the analysis of strength, vibration and other characteristics which relies on structural analysis is extending. On the other hand, heat analysis is generally classified into two kinds of analysis, i.e., heat conduction analysis dealing with the diffusion of heat in a solid body, and heat fluid dynamics analysis dealing with the movement of a fluid in addition to the diffusion of heat in a solid body. While heat conduction analysis is relatively easy to execute and widely used, the applicability of heat fluid dynamics analysis at the present stage is limited to a particular field and to particular objects having simple configurations since it needs large-scale calculations.

The increase in the package density and processing speed of advanced electronic equipment is so striking, the decrease in the power consumption of individual devices cannot keep abreast of the miniaturization of equipment. In fact, the power consumption per unit volume of equipment is steadily increasing. In these circumstances, traditional heat design relying on intuition and experience does not work and should be replaced with heat analysis and simulation using a computer, as has recently been put into discussion.

Many pieces of electronic equipment are cooled by a stream of air and, therefore, need the previously stated heat fluid dynamics analysis. Typical of methods for heat fluid dynamics analysis are a finite difference method and a finite element method. The problem with such methods is that the zone to be analyzed has to be divided into a difference grating or finite elements. Hence, modeling the internal space of complicated electronic equipment is extremely time and labor-consuming. Moreover, to analyze the behavior of a fluid minutely, the space has to be divided into a difference grating or finite elements extremely minutely, resulting in the need for a prohibitive preprocessing time. For this reason, the finite difference method and finite element method are scarcely used for practical designing purposes.

A method generally referred to as a node method is predominant in the heat analysis of electronic equipment. The node method divides the internal space of electronic equipment relatively roughly into blocks, defines representative points or so-called nodes at the center of the individual blocks, and then determines the energy balance amoung the nodes by solving simultaneous equations relating to the nodes. The advantage of the node method is that the propagation of heat from a solid body to a fluid such as air can be represented roughly in terms of heat transfer rate. Regarding heat transfer rate, a number of equations for analysis and experimental equations have been reported in the field of heat transfer engineering. By using any of such equations, it is possible to estimate the propagation of heat without resorting to the strict calculations of the behavior of a fluid, i.e., without solving Navier-Stokes equation. Hence, accurate results are achievable by relatively small-scale calculations.

However, the state of the art node method is not satisfactory in that the resultant model is much removed from the actual image of analyzed equipment since it represents the individual nodes by a heat equivalent circuit connected by heat resistors or a ventilation equivalent circuit connected by ventilation resistors. With the node method, therefore, it is difficult to generate a model for analysis by using CAD data with which the finite element method is practicable. Another drawback particular to the node method is that the resistances of heat resistors or those of ventilation resistors cannot be determined unless adequate equations are selected with reference to experimental equations or similar equation, requiring expert knowledge on heat transfer theories.

Referring to FIG. 6, a heat analysis procedure using the conventional node method is shown in a flowchart. The procedure will be described with reference also made to FIGS. 7A to 7D which illustrates a modeling sequence specifically. As shown in FIG. 6, the conventional method begins with a step 101 of simplifying a model of interest and dividing the simplified model into blocks. For example, as shown in FIG. 7A, the interior of electronic equipment is represented by such blocks. The equipment shown in FIG. 7A has a housing 120 which is provided with a blower or fan 122 and a ventilation opening 123. Various units 121 are accommodated in the housing 120. While the equipment has a tridimensional configuration in practice, let it be represented by a bidimensional configuration for the simplicity of description. As shown in FIG. 7B, the areas, or blocks in the tridimensional aspect, defined by dividing the entire space in the step S101 each has a rectangular or triangular shape (hexahedron or any other configuration in the tridimensional aspect). A node 130 is defined at the center of gravity of each of such divided blocks.

As shown in FIG. 7C, the nodes of the blocks 131 belonging to the fluid portions of the equipment, i.e., fluid nodes are connected together by ventilation resistors 140 to determine ventilation resistances (step 102). Specifically, the ventilation resistors 140 are determined by calculating on the basis of the ventilation cross-sectional areas of the blocks 131 represented by the nodes which are located at opposite ends of the individual resistors, the distances between associated nodes, the differences in cross-sectional area, etc. For such calculations, a reference has to be made to a great number of equations (103).

Subsequently, the rate, pressure, and other boundary conditions of air section 141 where the blower 122 is located are set up (104), and then simultaneous equations are solved to determine pressures (105). As a result, the pressures at the individual nodes and the rate of air to flow between each nearby nodes are produced (106). Since the equivalent heat conductivity between nearby nodes is calculated from the rate of air between them, the ventilation equivalent circuit shown in FIG. 7C and already constructed can be directly substituted for a heat equivalent circuit in the fluid portions if the heat conductivity is used as a resistance.

As shown in FIG. 7D, the heat conduction resistors 150 particular to the inside of solid bodies 121 which are disposed in the casing 120 and the heat transfer resistors 151 and 152 from the solid bodies 121 to the fluid are calculated and added to the above-mentioned heat equivalent circuit. As a result, a heat equivalent circuit representative of the entire equipment is completed. This part of the processing involves many kinds of inspections, e.g., referencing the physical properties of the individual materials (108) to calculate the heat resistances (107) and referencing equations (110) to calculate heat transfer or propagation coefficients (109).

After the heat equivalent circuit network has been generated, boundary temperature conditions such as the amount of heat generation are set up (111), and then simultaneous equations are solved to determine temperatures (112).

In the specific procedure shown in FIG. 6, only the steps 105 and 106 for setting up a coefficient matrix and the step 112 for solving simultaneous equations can be assigned to a computer, i.e., the rest of the procedure has to be done mainly by manual operations. Since the node method solves problems relating to heat in exactly the same manner as it deals with electric circuitry, software for general analysis is often used to execute the above-mentioned part of the procedure which can be implemented by a computer.

As stated above, the conventional heat analysis, whatever the method for implementing it may be, is difficult to practice when it comes to the interior of electronic equipment. Even the node method which is the most general-purpose scheme has some serious problems. Namely, the node method requires not only much manual work but also a great number of analyzing steps, needs highly expert knowledge such as for the calculation of heat resistances, has difficulty in calculating natural convection, and cannot easily implement calculations which take account of the characteristics of a blower or fan.

At the present stage of technologies, therefore, it is almost impossible to effect practical heat analysis of electronic equipment.

The applicable range of heat analysis may be limited to electronic equipment having a particular configuration such as one having a plurality of printed circuit boards arranged in parallel therein, as proposed in the past. In such a case, the entire procedure can be automated by, for example, parameteric input. This kind of scheme, however, is not applicable to various kinds of electronic equipment.

For example, assume that the node method is used to replace the entire electronic equipment 500 shown in FIG. 12A with an extremely rough heat equivalent circuit shown in FIG. 12D or a ventilation equivalent circuit shown in FIG. 12B. Then, the computer treats the equipment 500 as an electric circuit having resistors R and capacitors C which have nothing to do with the actual configuration of the equipment 500. It is therefore difficult to generate a model for the node method by use of the configuration data of general electronic equipment, compared to the finite element method or similar approach.

The electronic equipment 500 shown in FIG. 12A is a unit having printed circuit boards 551 which are regularly arranged in parallel to one another. Although the number and power consumption of printed circuit boards 551, the kind and number of blowers 552 and other factors may differ from one unit to another, all the units are similar in overall configuration. Therefore, the ventilation equivalent circuit shown in FIG. 12B and the heat equivalent circuit shwon in FIG. 12D can be generated if parameters are inputted. For example, a fluid passage 553 defined between nearby printed circuit boards 551 has a ventilation resistor b1 which is calculated from the mounting pitch a1 of the boards 551 and the area a2 of the passage 553. After the ventilation equivalent circuit has been determined, the actual operating point c3 is determined by calculation on the basis of a ventilation characteristic c3 particular to the unit 500 and a static pressure-to-rate characteristic c1 particular to each blower or fan 552, as shown in FIG. 12C. The linear velocity of air at each of various sections of the unit is determined on the basis of the resulted operating point c3, whereby the heat equivalent circuit shown in FIG. 12D is set up. The heat equivalent circuit of FIG. 12D has a printed circuit board d1, solid body nodes defined on the printed circuit board d1, fluid nodes defined in the space between nearby printed circuit boards, solid body heat conduction resistors d4 existing in the printed circuit board, heat conduction resistors d5, and equivalent heat conduction resistors d6 ascribable to the stream of air.

FIG. 13 schematically illustrates a heat analysis CAE system for executing the above-stated analysis procedure. As shown, the heat analysis CAE system has a display 561, an input device 562, a data input/output section 563, a parameter data store 564, a node data generator 565, a ventilation circuit generator 566, a ventilation circuit calculator 567, a heat circuit generator 568, a heat circuit calculator 569, a calculated pressure and rate data store 570, and a calculated temperature data store 571.

The problem with the heat analysis CAE system of the type described is that the operator cannot see at which part of the unit of interest the temperaure is high and at which part the rate of air stream is low directly and, therefore, needs some time to judge the results of calculation. This stems from the fact that parameters representative of the specifications of the unit are inputted as data and cannot be easily related to the calculated temperatures of nodes. Moreover, when the operator inputs wrong parameters by accident, the configuration image is not displayed. Then, it takes a substantial period of time to locate a defective section, and it is difficult to output the calculated configuration of the unit to a utility system such as a computer aided designing (CAD) system.

SUMMARY OF THE INVENTION

It is therefore an object of the present invention to provide a heat analysis CAE system capable of effecting the heat analysis of general electronic equipment without resorting to manual operations for calculations or to expert knowledge.

It is another object of the present invention to provide a heat analysis CAE system capable of rendering calculated temperatures and other factors visually.

In one aspect of the present invention, a heat analysis system for effecting heat analysis of equipment by numerical calculations comprises a dividing section for receiving first data representing the configuration of the equipment tridimensionally and dividing the first data into a plurality of blocks to generate second data representing nodes which are representative of the plurality of blocks, a store for storing third data representative of conditions for heat analysis of the equipment, a ventilation circuit generator responsive to the second and third data for generating fourth data representing an analysis model of a fluid which flows through the equipment in the form of a ventilation circuit network, a heat circuit generator responsive to the second and third data for generating fifth data representing an analysis model relating to heat which elements included in the equipment generate in the form of a heat circuit network, and a processing section for processing the fourth and fifth data to output sixth data including temperatures and pressures of the fluid.

In another aspect of the present invention, a method of effecting heat analysis of equipment by numerical calculations comprises the steps of preparing first data representing the configuration of the equipment tridimensionally, dividing the first data into a plurality of blocks to thereby generate second data representing nodes which are representative of the plurality of blocks, preparing third data representative of conditions for the heat analysis of the equipment, generating fourth data representing an analysis model of a fluid which flows through the equipment in the form of a ventilation circuit network, generating, on the basis of the second and third data, fifth data representing an analysis model relating to heat which elements included in the equipment generate in the form of a heat circuit network, and processing the fourth and fifth data to output sixth data including temperatures and pressures of the fluid.

In another aspect of the present invention, a system for effecting heat analysis of equipment by numerical calculations comprises a store for storing first data representative of parameters including the tridimensional configuration of the equipment, a first processing section for processing the first data to generate second data representative of a wire frame in a tridimensional space of the equipment, a second processing section for dividing the first data into a plurality of blocks to generate nodes representative of the plurality of blocks, and executing heat analysis of the equipment on the basis of the nodes to thereby output third data representative of the result of the heat analysis, and an outputting section for superposing the second and third data to output such data visually.

In a further aspect of the present invention, a method of effecting heat analysis of equipment by numerical calculations comprises the steps of preparing first data representative of parameters including the tridimensional configuration of the equipment, processing the first data to generate second data representative of a wire frame in a tridimensional space of the equipment, dividing the first data into a plurality of blocks to generate nodes representative of the plurality of blocks, and executing heat analysis of the equipment on the basis of the nodes to output third data representative of the result of the heat analysis, and combining the second and third data to output such data visually.

BRIEF DESCRIPTION OF THE DRAWINGS

The objects and features of the present invention will become more apparent from the following detailed description taken in conjunction with the accompanying drawings in which:

FIG. 16 is a flowchart representative of a specific procedure which a result display section also included in the embodiment of FIG. 8 executes.

DESCRIPTION OF THE PREFERRED EMBODIMENTS

Figure 1:
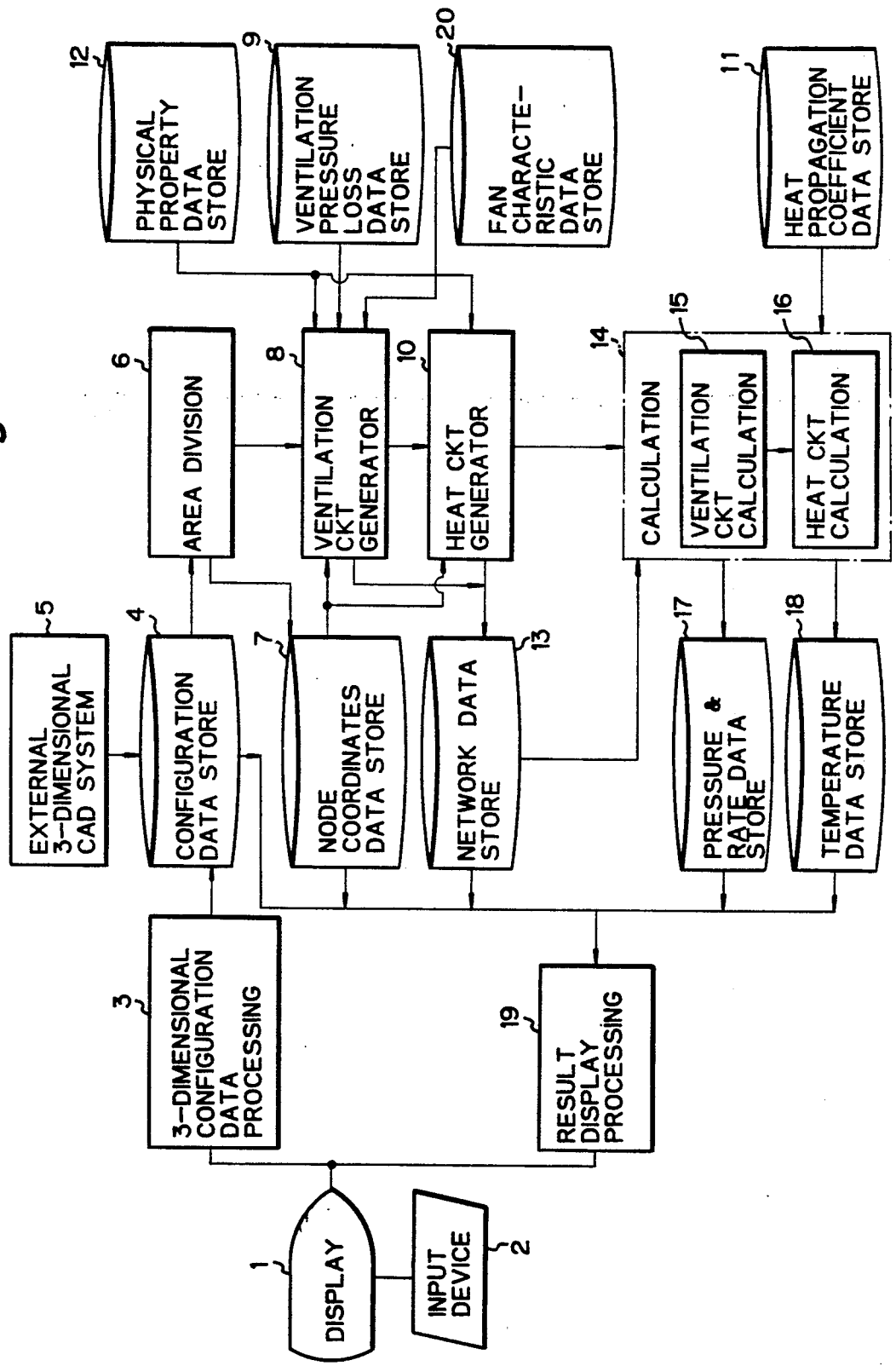
FIG. 1 is a block diagram schematically showing a preferred embodiment of the heat analysis CAE system in accordance with the present invention.

Referring to FIG. 1 of the drawings, a heat analysis CAE system embodying the present invention is shown and constructed and arranged to effect the heat analysis of the interior of general electronic equipment to be designed. As shown, the CAE system has an input device 2, a display 1, a tridimensional configuration data processing section 3, a configuration data store 4, a block division processing section 6, a node coordinates data store 7, a ventilation circuit generator 8, a ventilation pressure loss data store 9, a heat circuit generator 10, a heat conduction coefficient data store 11, a physical property data store 12, a network data store 13, a calculating section 14 including a ventilation circuit calculation 15 and a heat circuit calculation 16, a pressure and rate data store 17, a temperature data store 18, a result display processing section 19, and a fan characteristic data store 20.

Figure 5A:
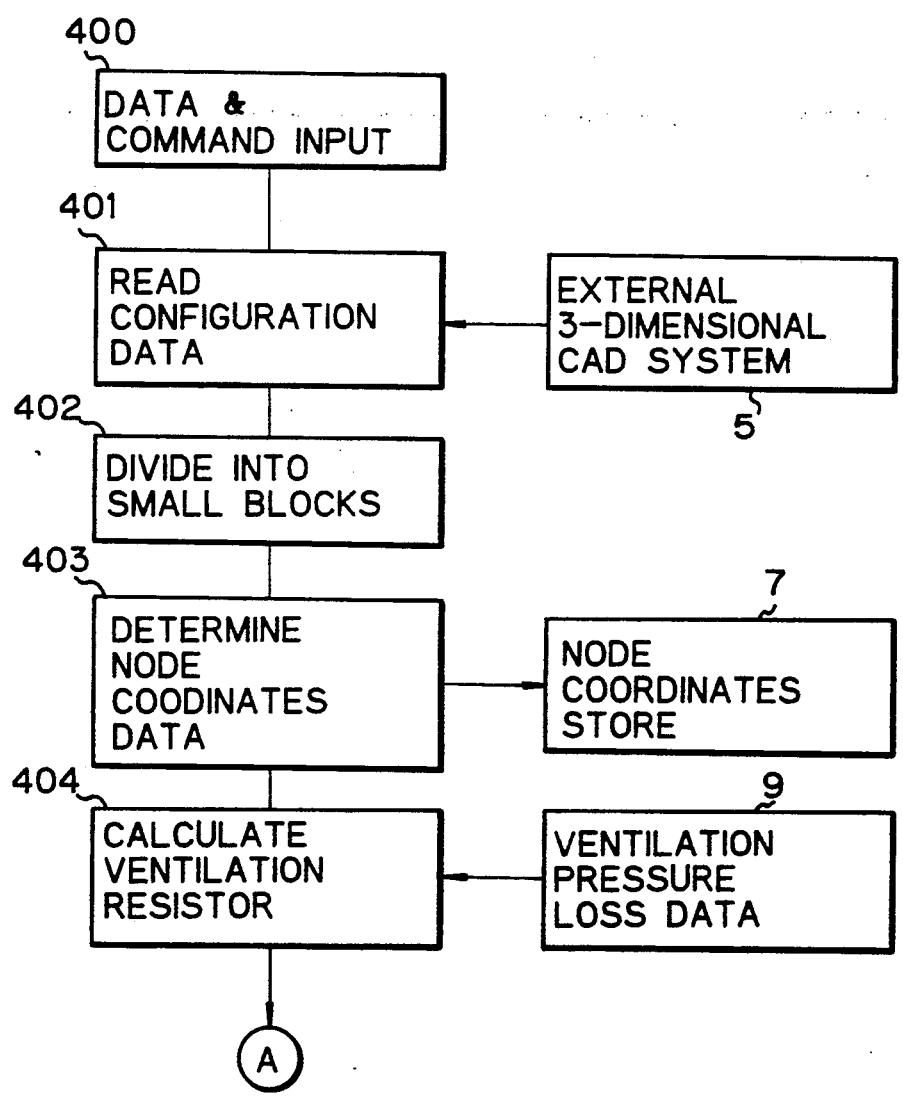
FIGS. 5A and 5B are flowcharts demonstrating a specific procedure to be executed by the embodiment.

The input device 2 is accessible for entering data and process commands (step 400, FIG. 5A). The display 1 displays the echo of entered data and the results of processing. The tridimensional configuration data processing 3 processes the configuration of equipment of interest to produce data representing the configuration by in straight lines, circles, arcs, etc. (step 401). This section 3 writes the resulted configuration data in the configuration data store 4 or updates the content of the store 4, as needed.

Figure 2:
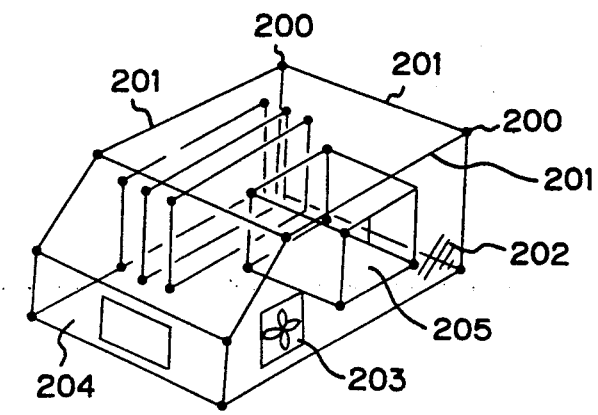
FIG. 2 is a perspective view showing data representative of the configuration of specific electronic equipment to be designed in the embodiment.

As shown in FIG. 2 specifically, the configuration data to be written to the configuration data store 4 are constituted by data representative of coordinates in a tridimensional space. Such data may be fed from an external tridimensional CAD system 5, if desired. As FIG. 2 indicates, the configuration data show the kinds of segments of a line 201, connecting points 200, surfaces 202 each being defined by a group of segments of a line 201, the attributes of a blower or fan 203 and ventilation opening 204 provided on particular surfaces 202, and a block 205 constituted by surfaces. Each structural part or element is provided with a particular amount of heat generation, heat transfer or propagation level, ventilation opening area ratio, etc.

Figure 5B:
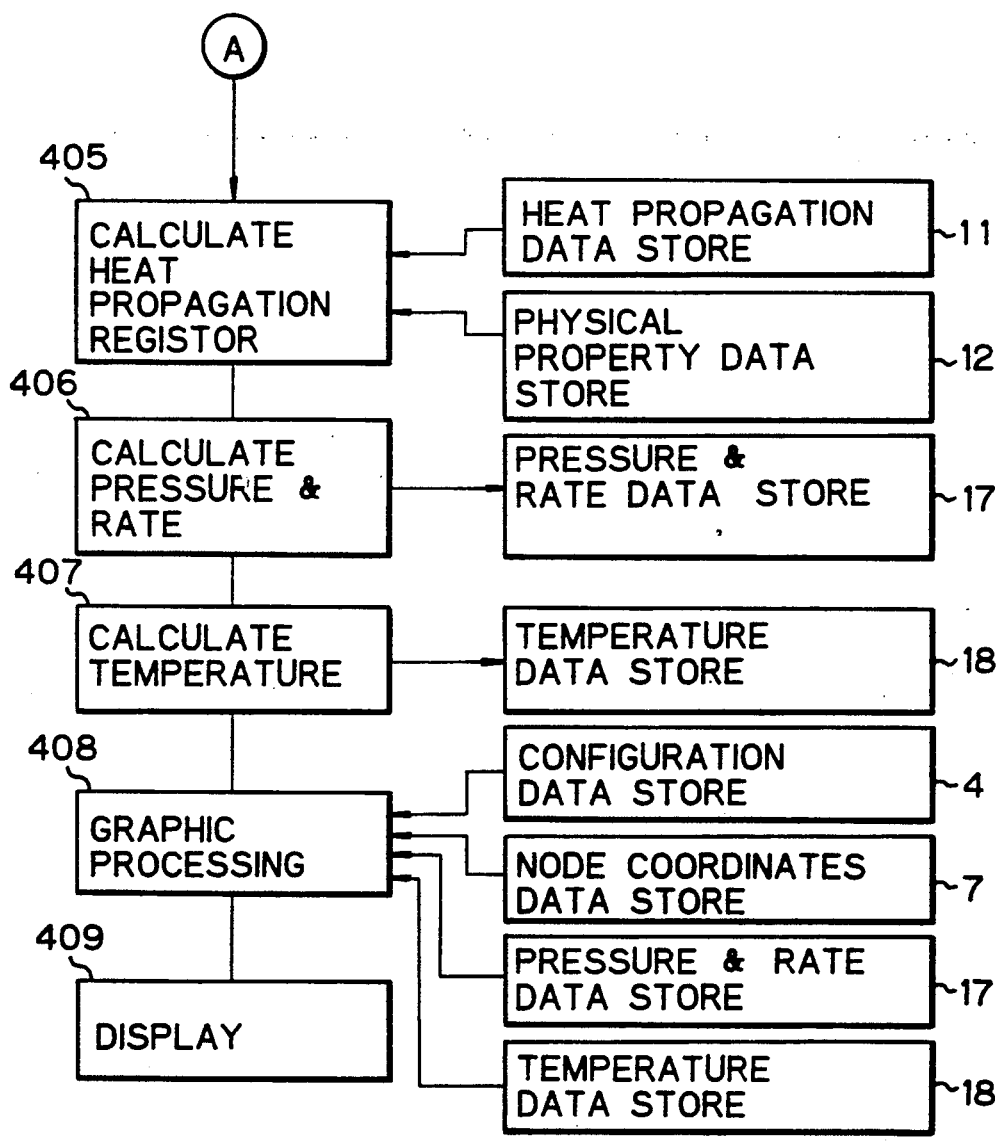
Figure 6:
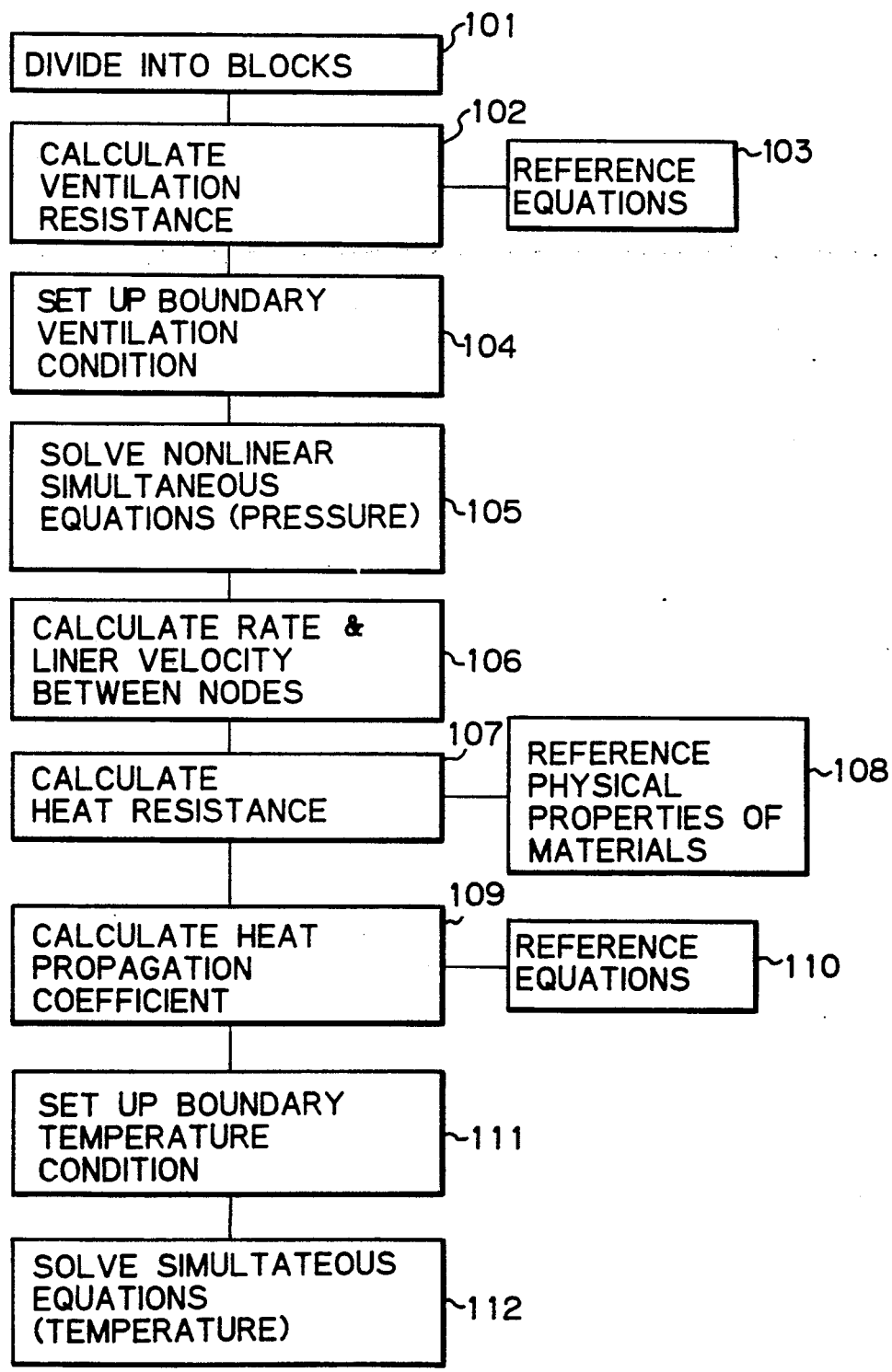
FIG. 6 is a flowchart indicative of a specific conventional procedure for heat analysis which is implemented by the node method.
Figure 7A:
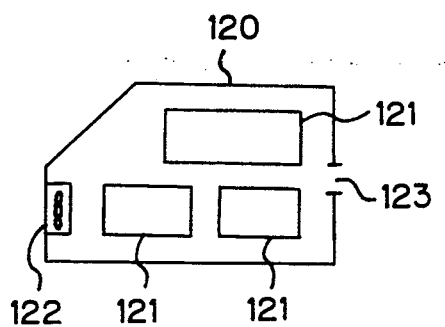
FIGS. 7A through 7D are views useful for understanding a modeling process associated with the node method.
Figure 7B:
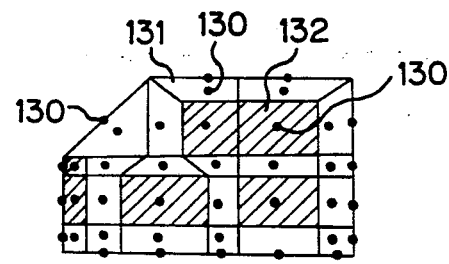
Figure 7C:
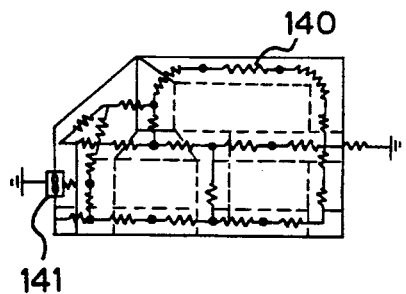
Figure 7D:
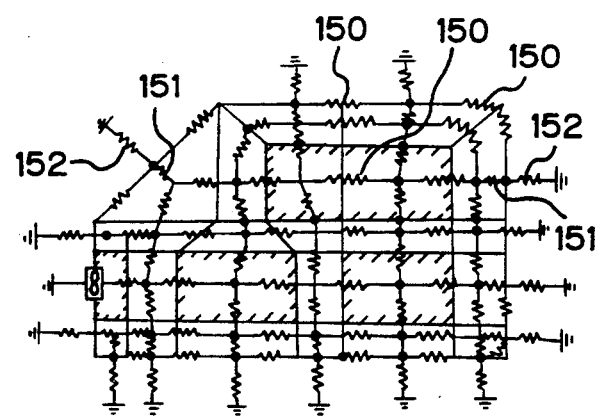

The block or area division processing 6 reads the configuration data out of the store 4 and divides the entire space available in the equipment of interest into small blocks, or areas in the bidimensional aspect (step 402), calculates the coordinates where the center of gravity of each block is located, and thereby generates nodes each being representative of the center of gravity (step 403). The ventilation circuit generator 8 calculates ventilation resistances in the fluid portions of the equipment by using the node coordinates data stored in the node coordinates data store 7 and by referencing ventilation pressure loss data stored in the ventilation pressure loss data store 9 beforehand (step 404). Likewise, the heat circuit generator 10 calculates heat conduction resistances in the solid body portions and heat transfer or propagation resistances between solid bodies and the fluid, on the basis of heat conduction coefficient data and physical property data stored in the heat propagation coefficient data store 11 and physical property data store 12, respectively (step 405, FIG. 5B). The results of such calculations are written to the network data store 13 in the form of network data.

The calculation 14 fetches the network data from the network data store 13 and causes the ventilation circuit calculation 15 thereof to calculate the pressures and rates of air (step 406) and then causes the heat circuit calculation 16 to calculate temperatures (step 407).

The result display processing 19 reads the configuration data, node coordinates data, pressure and rate data and temperature data out of the stores 4, 7, 17 and 18, respectively. Then, the result display processing 19 processes the results of calculation graphically (408) and displays the resulted graphic data on the display 1 (step 409).

Figure 3A:
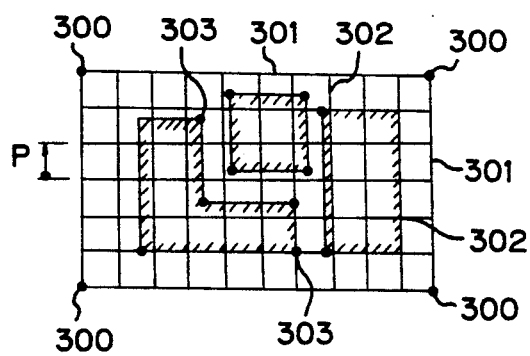
FIGS. 3A, 3B and 3C are views useful for understanding block or area division processing particular to the embodiment.

The illustrative embodiment has the above-outlined construction. Each of the functional blocks constituting the system executes particular processing, as follows. To begin with, the operation of the block division 6 will be described with reference to FIGS. 3A through 3C. While the block division 6 processes tridimensional data, let it be assumed to process bidimensional data to better understand the operation. The block division 6 picks up points 300 defining the housing of the equipment of interest out of the configuration data fetched from the configuration data store 4. Then, the area division 6 generates division lines 302 which divide the straight line forming the contour of the housing into N segments, at a predetermined pitch of P. The pitch P is selected automatically in the illustrative embodiment, although it may have any particular commanded value. To determine the pitch P automatically, the distance between each nearby points 303 which define the blocks incorporated in the housing is determined, and then a value intermediate between the greatest and smallest distances is selected. The result of the sequence of steps described so far is shown in FIG. 3A.

Figure 3B:
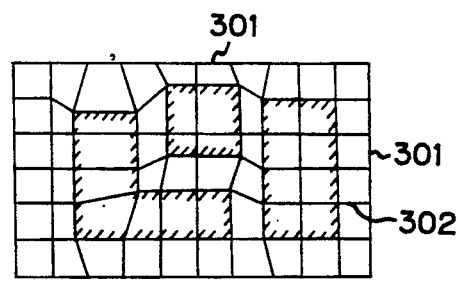

Subsequently, among the division lines 302, the lines 302 which do not coincide with and are positioned at the outside of the contours of the blocks incorporated in the housing and are not spaced apart from the contours by more than one half of the pitch P are extracted and then shifted into coincidence with the contours. The resulted condition is shown in FIG. 3B.

Figure 3C:
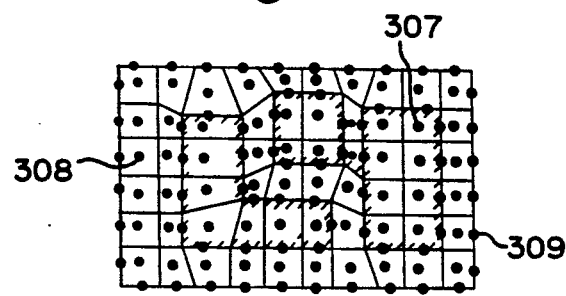

Thereupon, the coordinates of the center of gravity of each small area, or block in the tridimensional sense, produced by the above-stated division is determined to generate nodes 307, 308 and 309, as shown in FIG. 3C. Nodes are also generated on the surfaces of the housing and those of the blocks accommodated in the housing Node coordinates data representative of such nodes are written to the node coordinates data store 7. The ventilation circuit generator 8 fetches the node coordinates data from the store 7 and picks up, among the nodes, the nodes which are not included in the internal blocks, i.e., the nodes 308 in FIG. 3C.

Subsequently, the fluid nodes located in the small blocks which make surface-to-surface contact with each other are connected together by a ventilation resistor, and the resistance of such a resistor is calculated. The ventilation resistor includes a frictional loss resistor determined on the basis of the distance between the connected nodes and the area of the contacting surfaces, and a local pressure loss resistor determined on the basis of a difference in sectional area between nearby blocks and with reference to the data stored in the ventilation pressure loss data store 9. The ventilation pressure loss store 9 stores various numerical values determined by, for example, experiments beforehand, e.g., a table listing section variation ratios and pressure loss coefficients and a table listing ventilation opening ratios and pressure loss coefficients. Assuming that blower or fan data (fan 23, FIG. 2) has been inputted by the tridimensional configuration data processing 3, then the ventilation circuit generator 8 reads a fan data number matching the kind of the fan out of the fan characteristic data store 20 and gives it to the small blocks which include the fan. The ventilation resistors connecting the fluid nodes and generated by the above procedure are written in the form of network data to the network data store 13 in a coefficient matrix format.

The procedure then advances to the heat circuit generator 10. Specifically, the heat circuit generator 10, like the ventilation circuit generator 8, picks up solid body nodes, i.e., the nodes 309, FIG. 3C, included in the internal blocks and housing. Subsequently, the heat circuit generator 10 connects by a heat conduction resistor the solid body nodes located in the small blocks which make surface-to-surface or line-to-line contact with each other, and then calculates the resistance. Specifically, the heat circuit generator 10 calculates the resistance on the basis of the distance between the associated nodes, the contacting area, and the heat conductivities of the solid bodies, as with the fluid nodes. At this instance, the heat circuit generator 10 references the physical property data stored in the physical property data store 12. Further, the heat circuit generator 10 connects the solid body nodes generated on the surfaces of the internal block and housing by heat conduction resistors. Here, the resistances are not calculated since they are the function of the linear velocity of air stream.

Then, the operation is handed over to the calculation 14. The calculation 14 has the ventilation circuit calculation 14 and heat circuit calculation 16, as stated earlier. First, the ventilation circuit calculation 15 reads ventilation resistor data in the form of a coefficient matrix out of the network data store 13 and solves nonlinear simultaneous equations with such data. As a result, the pressures at the fluid nodes and the rates of air between the fluid nodes are outputted and written to the pressure and rate data store 17. The resulted data are also fed to the heat circuit calculation 16. In response, the heat circuit calculation 16 calculates equivalent heat conductivities on the bases of the rates of air between fluid nodes, calculates heat conduction resistors (between solid body nodes and fluid nodes) matching the rates of air, and thereby completes a heat conductivity coefficient matrix. Thereafter, the calculation 16 produces the temperatures at all of the nodes by solving simultaneous equations. When the pressure of a node depends on the temperature of the node, as is the case with natural convection, the two calculations 15 and 16 stated above repeats the processing alternately until the results converges. The resulted temperature data are written to the temperature data store 18.

The result display processing 19 reads the pressure and rate data and the temperature data out of the stores 17 and 18, respectively, as well as the configuration data, node coordinates data, and network data. Then, the processing 19 displays a temperature distribution and a rate distribution visually by the following procedure.

Figure 4:
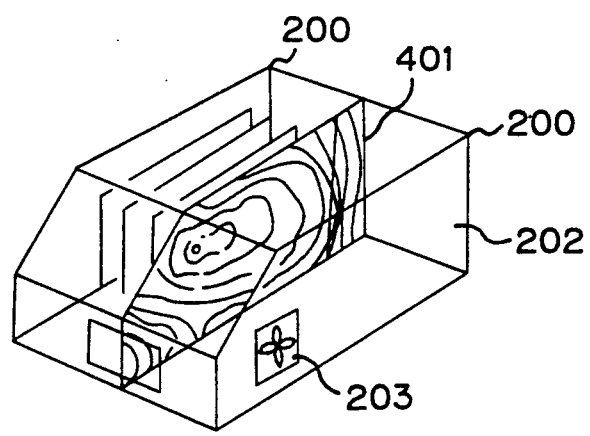
FIG. 4 indicates a specific result which a result display processing section included in the embodiment produces by processing the data shown in FIG. 2.

FIG. 4 shows a specific graphic image appearing on the display 1 as a result of processing executed by the result display processing 19. Specifically, the result display processing 19 fetches the configuration data from the configuration data store 4 to display the configuration of the equipment on the display 1. Then, the operator enters commands for specifying desired data such as temperatures, pressures or rate, the kind of display such as isotherms or vectors, and a desired section 401 or zone on the input device 2 by an interactive procedure. For example, when the temperature distribution of the particular section 401 of the equipment shown in FIG. 2 and the isotherms thereof are selected on the input device 2, the result display processing 19 interpolates the temperatures between the nodes by using the node coordinates data and temperature data read out of the node coordinates data store 7 and temperature data store 18, respectively. As a result, isotherms are drawn on the configuration of the equipment on the display 1, as shown in FIG. 4. For the ease of visual recognition, the result display processing 19 may delete hidden lines by calculating the coordinates of the graphic data in the depthwise direction on the screen.

As described above, what the illustrative embodiment forces the operator to do is simply entering data representative of the tridimensional configuration of desired equipment on the input device 2 (step 400, FIG. 5A). The block division 5 divides the entered tridimensional configuration into small blocks or, areas in the bidimensional sense. The ventilation circuit generator 8 and the heat circuit generator 10 generate respectively a ventilation circuit network and a heat circuit network as models for analysis by using the node data of the individual blocks and data fetched from a data base. The calculation 14 processes the ventilation circuit network and heat circuit network by calculations to determine temperatures and pressures. The embodiment, therefore, realizes a heat analysis CAE system having various advantages, as enumerated below.

(1) The procedure does not include any step that requires manual work, except for the entry of the configuration of equipment.

(2) Even a person with no expert knowledge on heat transfer can operate the system.

(3) The system can cope with a broad range of phenomena such as natural convention, forced convection, and steady and non-steady phenomena.

(4) Analysis which takes account of the characteristic of a blower, for example, is achievable.

Figure 8:
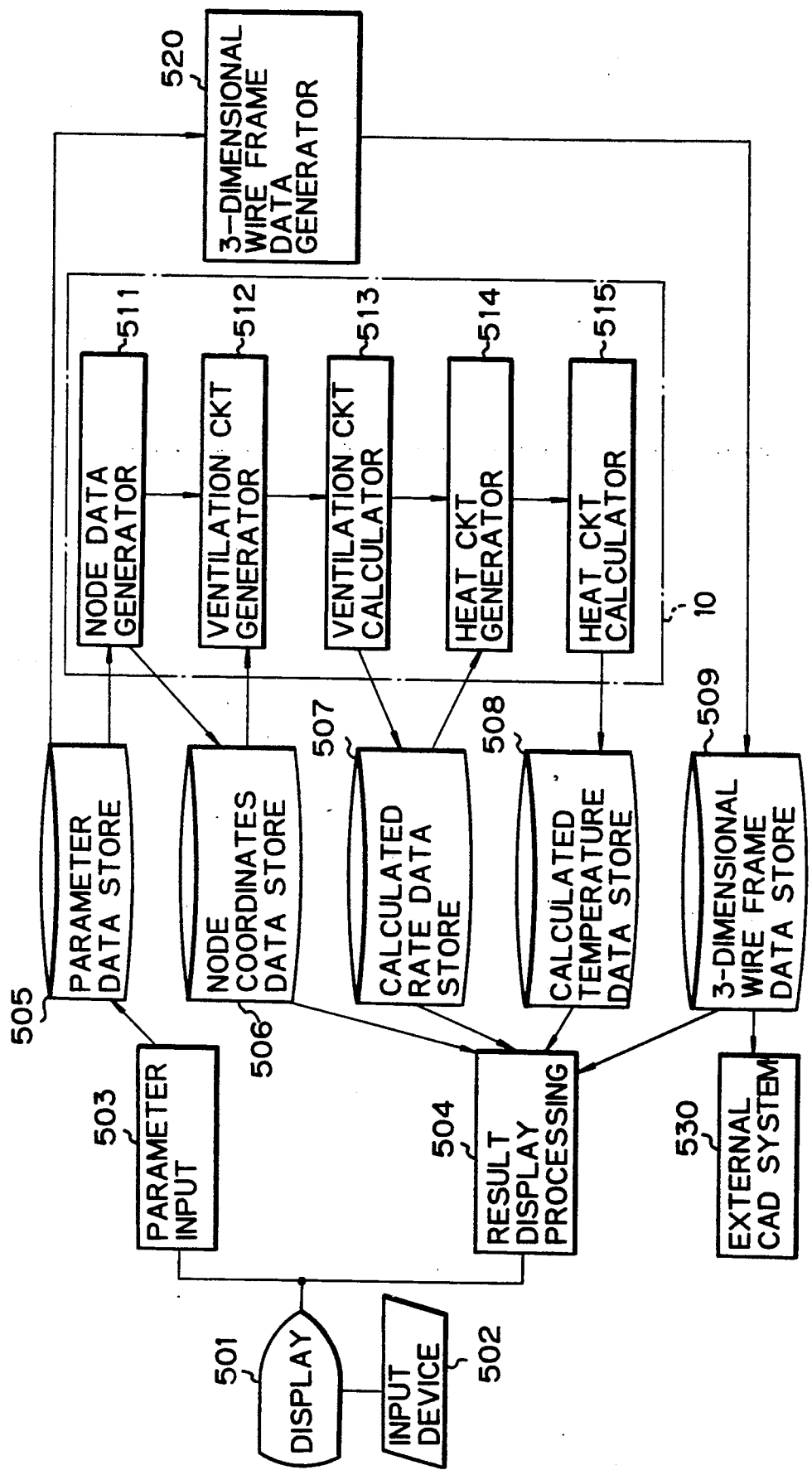
FIG. 8 is a block diagram similar to FIG. 1, schematically showing an alternative embodiment of the heat analysis CAE system in accordance with the present invention.
Figure 12A:
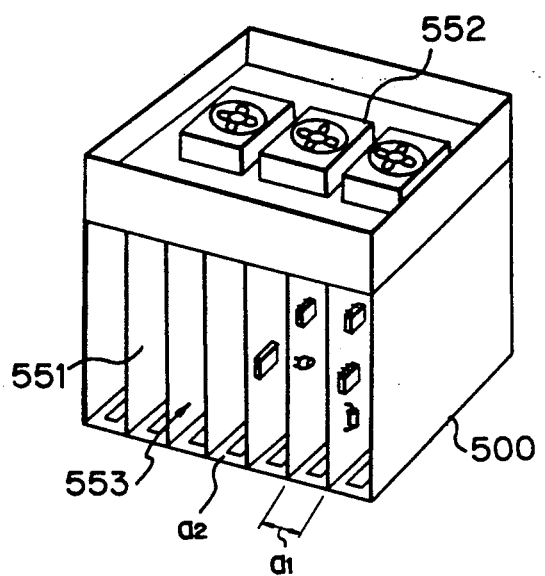
FIGS. 12A through 12D are views useful for understanding a modeling process using the node method.
Figure 12B:
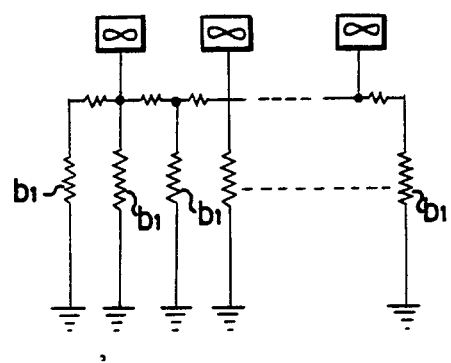
Figure 12C:
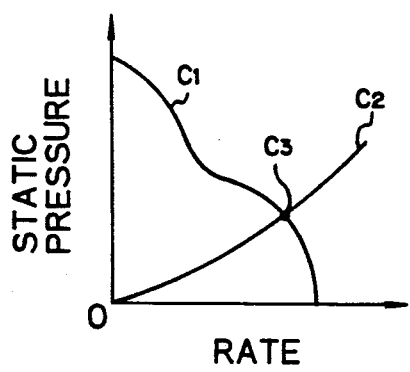
Figure 12D:
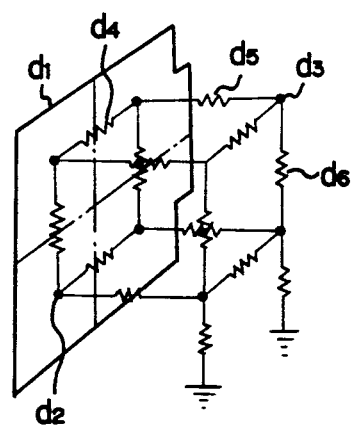
Figure 13:
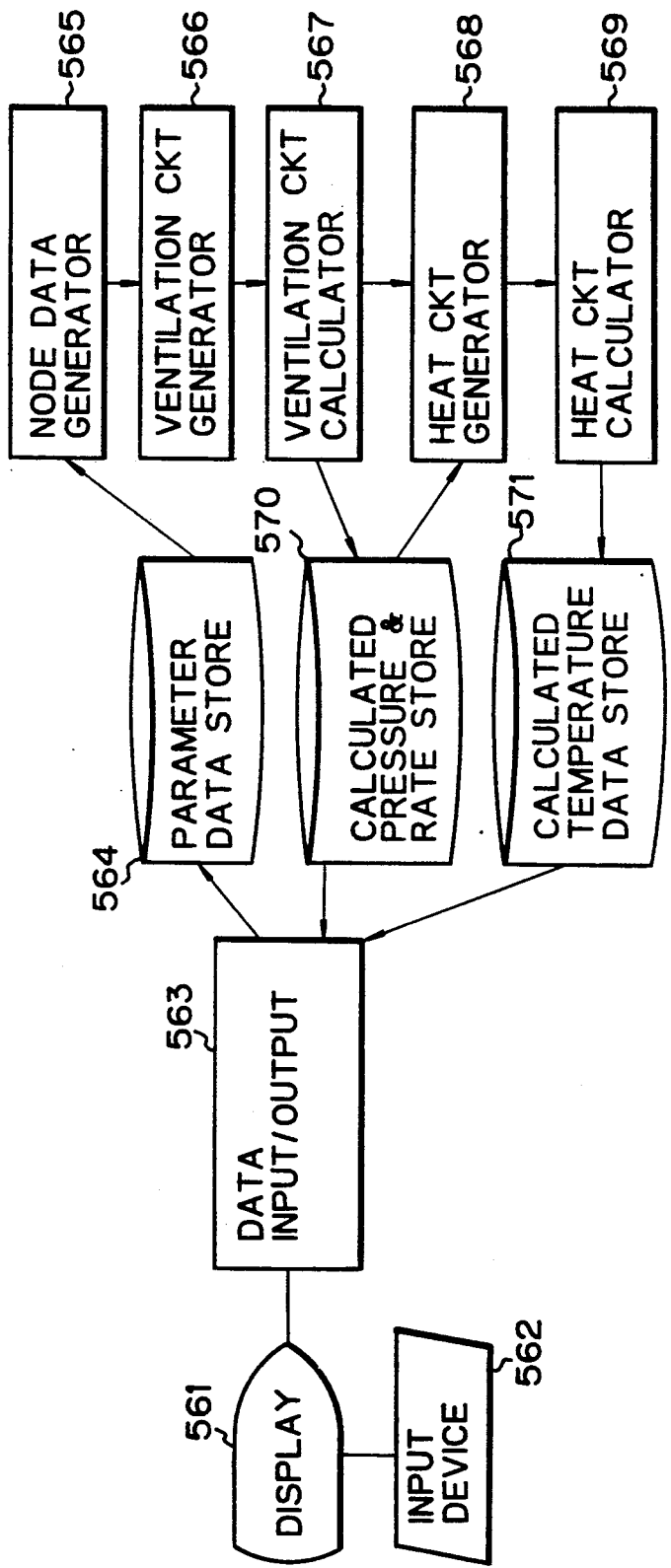
FIG. 13 is a block diagram schematically showing a conventional heat analysis system.

Referring to FIG. 8, an alternative embodiment of the heat analysis CAE system in accordance with the present invention will be described. This embodiment is constructed and arranged to effect the heat analysis of a unit of the type shown in FIG. 12A specifically and accommodating a plurality of printed circuit boards 531, FIG. 10. As shown, the heat analysis CAE system comprises a display 501, an input device 502, a parameter input section 503, a result display processing section 504, a parameter data store 505, a node data store 506, a calculated pressure and rate data store 507, a calculated temperature data store 508, a tridimensional wire frame data store 509, a node data generator 511, a ventilation circuit generator 512, a ventilation circuit calculator 513, a heat circuit generator 514, a heat circuit calculator 515, aand a tridimensional wire frame data generator 520. The node data generator 511, ventilation circuit generator 512, ventilation circuit calculator 513, heat circuit generator 514 and heat circuit calculator 515 constitute a calculation section 510.

The input device 502 is manipulated by the operator to enter data and commands The display 502 shows the operator the echo of entered data and the result of processing.

The parameter input section 503 reads the parameters of numerical values and characters representative of the specifications of equipment to be designed and writes them in the parameter data store 505 or updates the store 505, as needed. As listed in FIG.9, the parameters to be stored in the parameter data store 505 represent the specifications of the printed circuit boards. The inputted parameters are fed to the node data generator 511 and tridimensional wire frame data generator 520.

The processing to be executed by the calculation 510 first is assigned to the node data generator 511. Specifically, the calculation 510 generates node data, generates node coordinates data, and then writes the resulted node coordinates data in the node coordinates data store 506. Thereupon, the processing is handed over to the ventilation circuit generator 512. The ventilation circuit generator 512 generates a ventilation circuit, calculates pressures and rates by using the ventilation circuit, and then writes the results of calculations in the calculated pressure and rate data store 507.

Subsequently, the heat circuit generator 514 reads the calculated pressures and rates out of the calculated pressure and rate data store 7, and generates a heat circuit by using such data. The heat circuit calculator 515 calculates temperatures by use of the generated heat circuit. Finally, the temperatures produced by the heat circuit generator 515 appear on the display 501.

The tridimensional wire frame data generator 520 also fetches the parameter data from the parameter data store 515 and transforms them to tridimensional wire frame data. The tridimensional wire frame data are written to the tridimensional wire frame data store 509.

The result display processing 504 executes predetermined processing with the node coordinates data, calculated pressure and rate data, calculated temperature data, and tridimensional wire frame data stored in the stores 506, 507, 508 and 509, respectively, so as to display the results of processing on the display 501.

Figure 9:
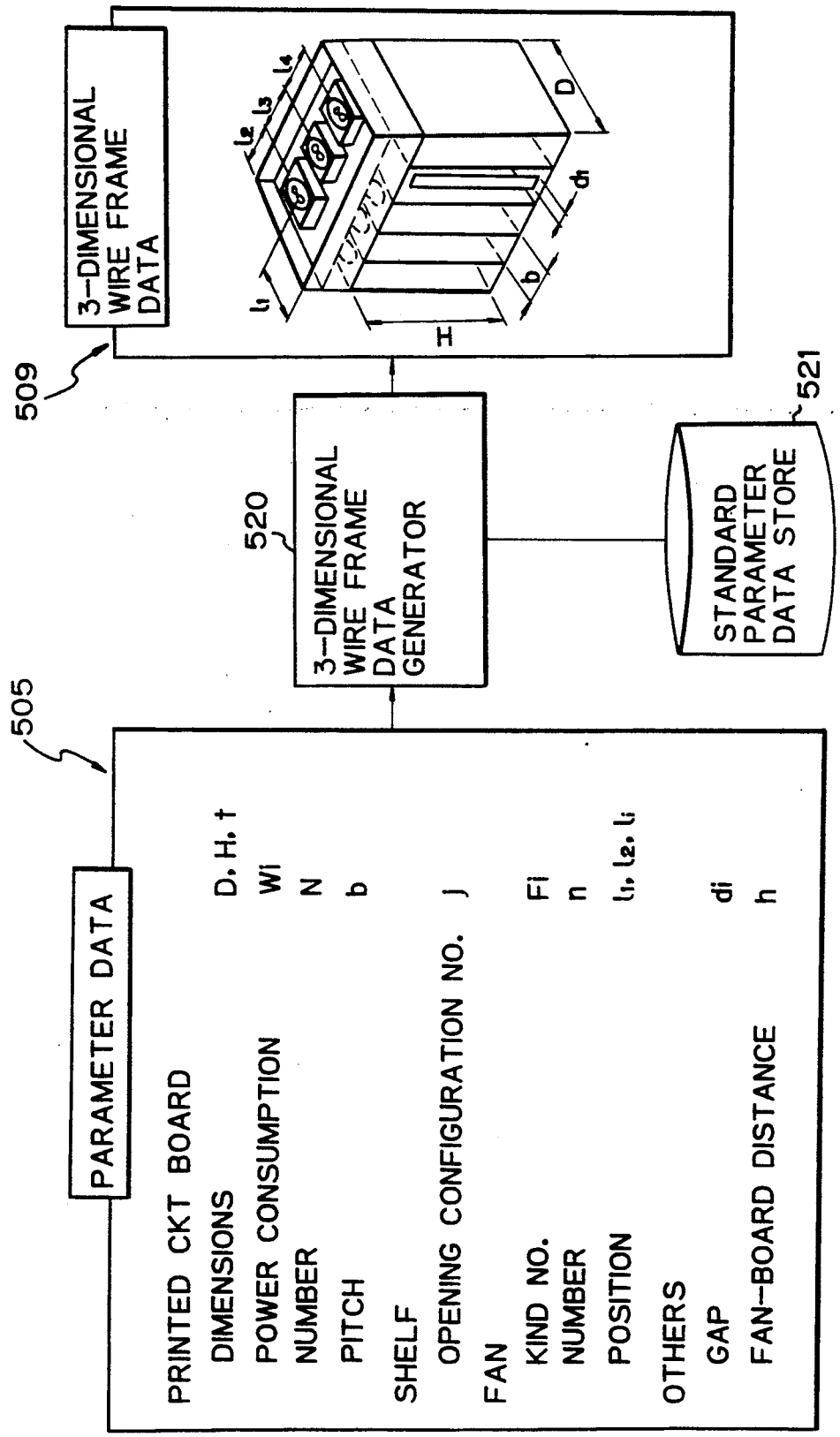
FIG. 9 is a schematic block diagram useful for understanding the operation of a tridimensional wire frame data generator included in the embodiment shown in FIG. 8.
Figure 14:
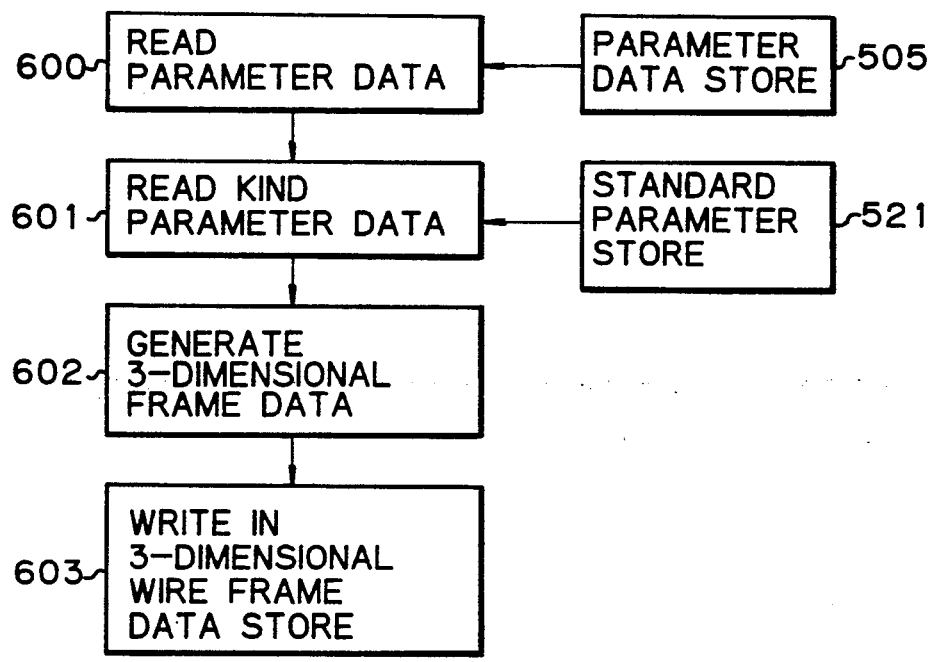
FIG. 14 is a flowchart demonstrating a specific tridimensional wire frame data generating procedure particular to the embodiment of FIG. 8.

The illustrative embodiment is constructed and operated as outlined above. The blocks constituting the CAE system each executes particular processing, as will be described hereinafter. To begin with, the tridimensional wire frame data generator 520 fetches parameter data from the parameter data store 505 (600, FIG. 14). As shown in FIG. 9, the parameter data are representative of the dimensions and kinds of the component parts and elements constituting the equipment. Wire frame data can be generated from the dimensional parameters automatically. For example, flat wire frame data can be generated in a tridimensional space on the basis of the dimensional data, e.g., the width D, height H and thickness t of the contour of a printed circuit board, e.g., 551, FIG. 12A. Further, if use is made of the parameter indicative of the mounting pitch of printed circuit boards and the parameter indicative of the number of printed circuit boards, it is possible to generate all of the printed circuit boards included in the equipment by describing the generated single flat plate N times at the pitch b. The kind parameter is used to fetch a predetermined configuration by designating the identification number assigned to the configuration. Although not shown in FIG. 8, the tridimensional wire frame data generator 520 fetches a predetermined configuration by accessing a standard parameter data store 521, FIG. 9, by using the kind parameter, thereby generating a wire frame. A ventilation opening and the shape thereof, for example, are fetched by the wire frame data generator 520 when the number j assigned to the ventilation opening is inputted. Then, the wire frame data generator 520 locates the ventilation opening at the intermediate between two nearby printed circuit boards. The wire frame data are written to the tridimensional wire frame data store 509 in a predetermined format constituted by segments of a line, arcs and other fundamental graphic elements.

Figure 10:
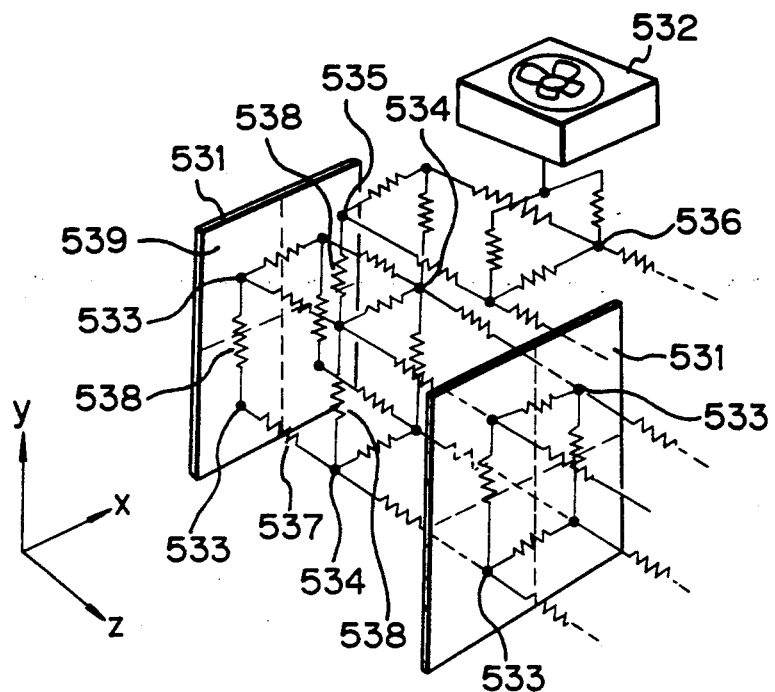
FIG.10 shows a specific ventilation and heat conduction circuit network.
Figure 15:
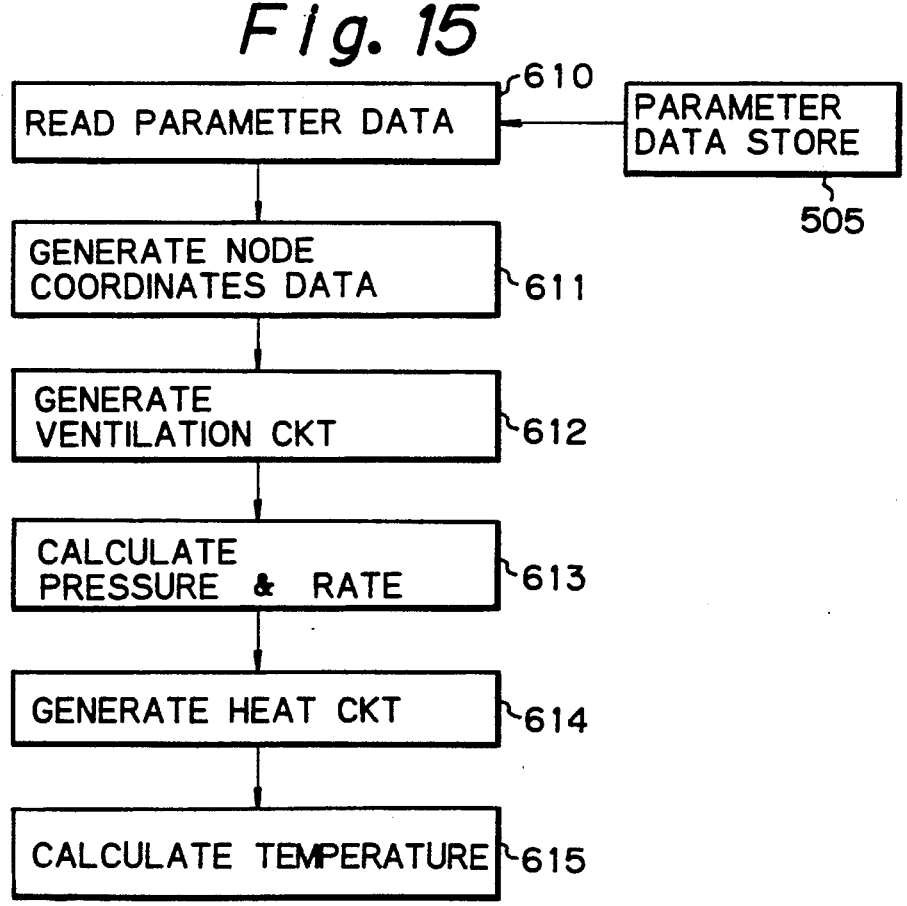
FIG. 15 is a flowchart showing a specific sequence of steps executed by a calculating section also included in the embodiment of FIG. 8.

As shown in FIG.10, the node data generator 511, FIG. 8, fetches the parameter data (610, FIG. 15) to generate representative points, i.e., nodes 533 which will be used to calculate pressures and temperatures (611). In FIG. 10, the reference numerals 531 and 532 designate printed circuit boards and a blower or fan, respectively. To generate the nodes 533 shown in FIG. 10, the node data generator 511 divides each printed circuit board 531 into a plurality of small areas 539 and then calculates the coordinates of the center of gravity of each of such small areas 539. Subsequently, the node data generator 511 generates fluid nodes 534 at the center of the space between the nearby printed circuit boards 531 and at positions having the same x and y coordinates with the nodes 533 having been generated on the boards 531. Further, the node data generator 511 generates fluid nodes 535 and 536 at the center of the space between the fan 532 and the printed circuit boards 531 and at positions having the same x and y coordinates as the fluid nodes 534.

As shown in FIG. 10, the ventilation circuit generator 512 generates a ventilation circuit by connecting only the fluid nodes 534, 535 and 536 by ventilation resistors 538 (612). The values of the ventilation resistors 538 are determined by calculation on the basis of the pitch of the printed circuit boards and the distances between the nodes, stored in a transfer matrix format, and handed over to the ventilation circuit calculator 513. Thereafter, the ventilation circuit calculator 513, heat circuit generator 514, and heat circuit calculator 515 execute processing 613, 614 and 615 which are identical with the processing of the corresponding sections shown in FIG. 1.

Figure 11:
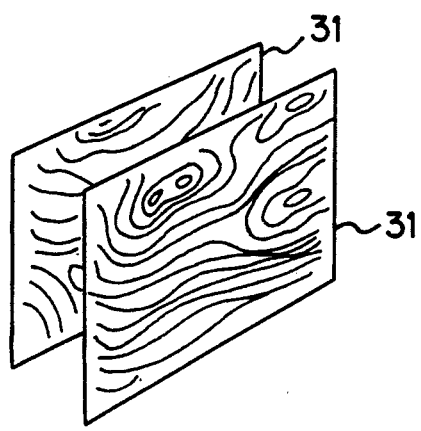
FIG. 11 shows a specific condition in which the isotherms of printed circuit boards shown in FIG. 10 are displayed.

The result display processing 504 fetches the node coordinates data, calculated pressure and rate data, calculated temperature data, and tridimensional wire frame data respectively stored in the stores 506, 507, 508 and 509 by the above-described sequence of steps (620, FIG. 16). Then, this section 504 displays the external appearance of the entire equipment by use of the tridimensional wire frame data on the display 501 in a perspective view, trihedral figure or similar figure (621). The operator enters commands designating desired data such as temperatures, pressures or rates, the desired kind of display such as isotherms, vectors or painting, and desired zone or part on the input device 502 by an interactive procedure (621). Assuming that the the temperature distribution on the surface of each printed circuit board 531 should be displayed by isotherms, the result display processing 504 interpolates the temperatures between the nodes on the basis of the none coordinates data and calculated temperature data to thereby draw isotherms on a tridimensional wire frame image (622). As a result, isotherms appear on the display 501, as shown in FIG. 11 specifically. To make the image on the screen easier to see, extra processing such as deleting hidden lines may be executed. As shown in FIG. 8, the wire frame data stored in the wire frame data store 509 may be transferred to an external CAD system 530, as needed.

While the illustrative embodiment has been shown and described as handling a printed circuit board unit, the present invention is applicable to objects of the type which can be rendered by some different parameters.

As stated above, this embodiment has the tridimensional wire frame data generator 520 which generates tridimensional wire frame data. This allows the operator to recognize the result of calculation easily on the display 501 by performing a minimum of necessary work. The CAE system, therefore, entails a minimum of erroneous input and incorrect decision and completes analysis within a short period of time.

In addition, the embodiment allows configuration data to be transferred to a CAD system and thereby causes the resultant design drawing to reflect the data used for analysis without errors ascribable to manual operations.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A heat analysis system for effecting thermal analysis of equipment by numerical calculations, comprising:
   block division processing means for receiving first data representing a tridimensional configuration of the equipment from an external tridimensional CAD system and dividing said first data into a plurality of blocks to generate second data which are nodes representative of said plurality of blocks;

storing means for storing third data representative of previously calculated external parameters for thermal analysis of the equipment;

ventilation circuit generating means responsive to said second data and third data for generating fourth data representing a ventilation model of a fluid which flows through the equipment in the form of a ventilation network;

thermal network generating means responsive to said second data and said third data for generating fifth data representing a thermal analysis model relating to thermal conductance of elements included in the equipment in the form of a thermal equivalent network; and first processing means for processing said fourth data, said fifth data and said external parameters stored in said storing means to output sixth data including temperatures, pressures, and volume of the fluid calculated at all of the nodes.

2. A system in accordance with claim 1 wherein said block division processing means calculates the center of gravity of each said block and generates said second data representative of said nodes by using the resulting centers of gravity.

3. A system in accordance with claim 1 wherein said third data stored in said storing means include the flow pressure loss coefficient of the fluid and heat transfer coefficients and physical properties of the elements included in the equipment.

4. A system as claimed in claim 1 further comprising second processing means for generating seventh data by superimposing said sixth data on said first data representative of the configuration of the equipment received from said external tridimensional CAD system.

5. A system as claimed in claim 4 further comprising outputting means for displaying said seventh data in response to said second processing means.

6. A method of effecting thermal analysis of equipment by numerical calculations, comprising the steps of:
(a) receiving first data inputted by an external tridimensional CAD system and representing a tridimensional configuration of the equipment;
(b) dividing said first data into a plurality of blocks thereby to generate second date which are nodes representative of said plurality of blocks;
(c) referring to and reading third data representative of previously calculated external parameters for the thermal analysis of the equipment;
(d) generating fourth data representing a ventilation model of a fluid which flows through the equipment in the form of a ventilation circuit network;
(e) generating, on the basis of said second data and said third data, fifth data representing a thermal analysis model relating to thermal conductance of elements included in the equipment in the form of a heat circuit network; and
(f) processing said fourth data, fifth data, and said external parameters stored in said storing means to thereby output sixth data including temperatures, pressures, and volume of the fluid calculated at all of the nodes.

7. A method in accordance with claim 6 wherein step (b) comprises: (g) calculating the center of gravity of each of said blocks and generating said second data representing said nodes by the resulting centers of gravity.

8. A method in accordance with claim 6 wherein step (c) comprises referencing said third data including the flow pressure loss coefficient of the fluid and heat transfer coefficients and physical properties of the elements included in the equipment.

9. A method in accordance with claim 6 further comprising the step of (i) generating seventh data by superimposing said sixth data on said first data representative of the configuration of the equipment.

10. A method in accordance with claim 9 further comprising the step of (j) displaying said seventh data on a display 11. A system for effecting thermal analysis of equipment by numerical calculations, comprising:
storing means for storing first data representative of parameters including a tridimensional configuration of the equipment;
first processing means for processing said first data to generate second data representative of a wire frame in a tridimensional space of the equipment;
second processing means for dividing said second data into a plurality of blocks to generate nodes representative of said plurality of blocks, and for executing thermal analysis of the equipment on the basis of said nodes to output third data representative of a result of said thermal analysis; and
outputting means for superimposing said third data on said second data to output said second data and said third data visually on a display thereof.

12. A system in accordance with claim 11 wherein said second processing means comprises:
dividing means for receiving said first data and for dividing said first data into a plurality of blocks to thereby generate fourth data which are nodes representative of said plurality of blocks;
ventilation circuit generating means responsive to said fourth data for generating fifth data representing a ventilation model of a fluid which flows through the equipment in the form of a ventilation circuit network;
heat circuit generating means responsive to said fourth data for generating sixth data representing a thermal analysis model of the thermal conductance of elements included in the equipment in the form of a thermal circuit network; and
third processing means for processing said fifth data and said sixth data to output data including temperatures, pressures, and volume of the fluid.

13. A system in accordance with claim 11 further comprising fourth processing means for generating data representative of a configuration of the equipment on the basis of said second data, and for generating seventh data by superimposing said third data on said second data.

14. A system in accordance with claim 13 further comprising outputting means for displaying said seventh data on a display in response to said fourth processing means.

15. A system in accordance with claim 14 further comprising inputting means for inputting a command for designating a region of said second data;
said fourth processing means being responsive to said command for designating a region of said second data to superimpose said third data on said region of said second data to be outputted to said outputting means.

16. A method of effecting heat analysis of equipment by numerical calculations, comprising the steps of:
(a) receiving first data inputted by an external tridimensional configuration CAD system and representative of parameters including a tridimensional configuration of the equipment;

(b) processing said first data to generate second data representative of a wire frame in a tridimensional space of the equipment;

(c) dividing said second data into a plurality of blocks to generate nodes representative of said plurality of blocks, and executing thermal analysis of the equipment on the basis of said nodes to output third data representative of a result of said thermal analysis; and (d) combining said second data and said third data by superimposing said third data on said second data to output said second data and said third data visually on a display.

17. A method in accordance with claim 16 further comprising the steps of:

(e) generating, on the basis of said generated nodes, fourth data representing a ventilation model of a fluid which flows through the equipment in the form of a ventilation circuit network;

(f) generating, on the basis of said generated nodes, fifth data representing an analysis model relating to the thermal conductance of elements included in the equipment in the form of a thermal circuit network; and (g) processing said fourth data and said fifth data to output data including temperature, pressures, and volume of the fluid.

18. A method in accordance with claim 16 further comprising the step of (h) generating sixth data representative of a configuration of the equipment on the basis of said second data, and superimposing said third data on said sixth data to display said sixth data on a display.

19. A method in accordance with claim 18 further comprising the step of (i) inputting a command for designating a region of said second data which is to produce said third data; and step (d) comprising (j) superimposing said third data on said region of said second data representing said nodes in response to said command.

* * * * *